United States Patent
Chavez et al.

(10) Patent No.: US 8,281,369 B2
(45) Date of Patent: Oct. 2, 2012

(54) METHOD AND APPARATUS FOR CREATING SECURE WRITE-ENABLED WEB PAGES THAT ARE ASSOCIATED WITH ACTIVE TELEPHONE CALLS

(75) Inventors: David L. Chavez, Broomfield, CO (US); Howard G. Kradjel, Lincroft, NJ (US); Paul Roller Michaelis, Louisville, CO (US); Sean Moore, Hollis, NH (US); Lee Joseph Wilson, Freehold, NJ (US)

(73) Assignee: Avaya Inc., Basking Ridge, NJ (US)

( * ) Notice: Subject to any disclaimer, the term of this patent is extended or adjusted under 35 U.S.C. 154(b) by 1093 days.

(21) Appl. No.: 12/047,302

(22) Filed: Mar. 12, 2008

(65) Prior Publication Data

US 2009/0235329 A1    Sep. 17, 2009

(51) Int. Cl.
G06F 7/04 (2006.01)
H04L 29/06 (2006.01)

(52) U.S. Cl. ............................................. 726/3; 713/151
(58) Field of Classification Search ...... 726/3; 713/182, 713/151; 709/217, 219, 229
See application file for complete search history.

(56) References Cited

U.S. PATENT DOCUMENTS

| | | | |
|---|---|---|---|
| 5,035,252 A | 7/1991 | Mondre | |
| 5,537,447 A | 7/1996 | Urbansky | |
| 5,619,514 A | 4/1997 | Smith | |
| 5,745,425 A | 4/1998 | Anderson et al. | |
| 5,859,882 A | 1/1999 | Urbansky | |
| 5,920,507 A | 7/1999 | Takeuchi et al. | |
| 6,141,788 A | 10/2000 | Rosenberg et al. | |
| 6,170,075 B1 | 1/2001 | Schuster et al. | |
| 6,243,836 B1 | 6/2001 | Whalen | |
| 6,260,071 B1 | 7/2001 | Armistead et al. | |
| 6,381,645 B1 | 4/2002 | Sassin | |
| 6,434,590 B1 | 8/2002 | Blelloch et al. | |
| 6,434,606 B1 | 8/2002 | Borella et al. | |
| 6,452,950 B1 | 9/2002 | Ohlsson et al. | |
| 6,650,637 B1 | 11/2003 | Bansal et al. | |
| 6,690,675 B1 | 2/2004 | Kung et al. | |
| 6,763,226 B1 | 7/2004 | McZeal, Jr. | |
| 6,769,027 B1 | 7/2004 | Gebhardt et al. | |
| 6,823,047 B1 | 11/2004 | Cruickshank | |

(Continued)

FOREIGN PATENT DOCUMENTS

DE    10211740    10/2003

(Continued)

OTHER PUBLICATIONS

U.S. Appl. No. 12/406,784, filed Mar. 18, 2009, Michaelis, et al.

(Continued)

*Primary Examiner* — Nathan Flynn
*Assistant Examiner* — Abdullah Almamun
(74) *Attorney, Agent, or Firm* — Sheridan Ross P.C.

(57) ABSTRACT

The proposed invention provides a user-friendly way for people to turn a traditional in-progress voice-only telephone call into a multi-media call. This may be accomplished using various technologies that can be provided over the Internet or some other multi-media computing/networking platform. The multi-media aspect of the invention may be used to facilitate the sharing of additional information between the call participants as well as dynamically update security aspects (e.g., encryption keys) associated with call.

20 Claims, 8 Drawing Sheets

U.S. PATENT DOCUMENTS

| | | | |
|---|---|---|---|
| 6,832,254 B1* | 12/2004 | Scoggins et al. | 709/227 |
| 6,845,129 B2 | 1/2005 | Golin | |
| 6,862,298 B1 | 3/2005 | Smith et al. | |
| 6,879,582 B1 | 4/2005 | Dhara et al. | |
| 6,914,964 B1 | 7/2005 | Levine | |
| 6,977,948 B1 | 12/2005 | Chennubhotla et al. | |
| 7,203,193 B2 | 4/2007 | Hoof | |
| 7,215,959 B2 | 5/2007 | Creamer et al. | |
| 7,293,176 B2 | 11/2007 | Otway et al. | |
| 7,352,766 B2 | 4/2008 | Van Asten et al. | |
| 7,359,979 B2 | 4/2008 | Gentle et al. | |
| 7,385,985 B2 | 6/2008 | Narsinh et al. | |
| 7,386,115 B2 | 6/2008 | Peters | |
| 7,418,002 B2 | 8/2008 | Robotham et al. | |
| 7,496,750 B2 | 2/2009 | Kumar et al. | |
| 7,626,994 B2 | 12/2009 | Bennett | |
| 7,627,097 B2 | 12/2009 | Kawabata et al. | |
| 7,702,947 B2 | 4/2010 | Peddada | |
| 2001/0028634 A1 | 10/2001 | Huang et al. | |
| 2002/0073208 A1 | 6/2002 | Wilcock et al. | |
| 2002/0101853 A1 | 8/2002 | Siegrist et al. | |
| 2003/0163328 A1 | 8/2003 | Rambo et al. | |
| 2003/0198218 A1 | 10/2003 | Farris et al. | |
| 2004/0057445 A1 | 3/2004 | LeBlanc | |
| 2004/0076190 A1 | 4/2004 | Goel et al. | |
| 2004/0120309 A1 | 6/2004 | Kurittu et al. | |
| 2004/0233898 A1 | 11/2004 | Otsuka et al. | |
| 2005/0074008 A1 | 4/2005 | Herledan et al. | |
| 2005/0094618 A1 | 5/2005 | Colban et al. | |
| 2005/0249146 A1 | 11/2005 | Pinault et al. | |
| 2006/0007915 A1 | 1/2006 | Frame | |
| 2006/0062371 A1 | 3/2006 | Vanderheiden et al. | |
| 2006/0083199 A1 | 4/2006 | Yang | |
| 2006/0126667 A1 | 6/2006 | Smith et al. | |
| 2006/0140221 A1 | 6/2006 | Yamada et al. | |
| 2006/0166716 A1 | 7/2006 | Seshadri et al. | |
| 2006/0203805 A1 | 9/2006 | Karacali-Akyamac et al. | |
| 2006/0233158 A1 | 10/2006 | Croak et al. | |
| 2006/0251051 A1 | 11/2006 | Bhatt et al. | |
| 2006/0256772 A1 | 11/2006 | Yarlagadda | |
| 2006/0277051 A1 | 12/2006 | Barriac et al. | |
| 2006/0294387 A1* | 12/2006 | McCracken et al. | 713/182 |
| 2007/0026852 A1 | 2/2007 | Logan et al. | |
| 2007/0081460 A1 | 4/2007 | Karacali-Akyamac et al. | |
| 2007/0110034 A1 | 5/2007 | Bennett | |
| 2007/0147399 A1 | 6/2007 | Deng et al. | |
| 2007/0167156 A1 | 7/2007 | Hundal | |
| 2007/0177579 A1 | 8/2007 | Diethorn et al. | |
| 2007/0183323 A1 | 8/2007 | Hannu et al. | |
| 2007/0211704 A1 | 9/2007 | Lin et al. | |
| 2007/0223467 A1 | 9/2007 | Makiuchi et al. | |
| 2007/0280428 A1 | 12/2007 | McClelland | |
| 2007/0291733 A1 | 12/2007 | Doran et al. | |
| 2008/0002689 A1 | 1/2008 | Vera | |
| 2008/0013528 A1 | 1/2008 | Miller et al. | |
| 2008/0165708 A1 | 7/2008 | Moore et al. | |
| 2008/0187108 A1 | 8/2008 | Engelke et al. | |
| 2008/0205377 A1 | 8/2008 | Chao et al. | |
| 2008/0232353 A1 | 9/2008 | Vafin et al. | |
| 2008/0232442 A1 | 9/2008 | Rodbro et al. | |
| 2008/0240004 A1 | 10/2008 | Shaffer et al. | |
| 2008/0285599 A1 | 11/2008 | Johansson et al. | |
| 2008/0298336 A1 | 12/2008 | Gollamudi | |
| 2008/0298349 A1 | 12/2008 | Beightol et al. | |
| 2008/0310398 A1 | 12/2008 | Jain et al. | |
| 2009/0074012 A1 | 3/2009 | Shaffer et al. | |
| 2009/0213837 A1 | 8/2009 | Ku et al. | |
| 2009/0234940 A1 | 9/2009 | Pal et al. | |
| 2009/0241763 A1* | 10/2009 | Revord | 89/1.11 |
| 2010/0165857 A1 | 7/2010 | Meylan et al. | |

FOREIGN PATENT DOCUMENTS

| | | |
|---|---|---|
| DE | 102006027708 | 2/2008 |
| EP | 0152251 | 8/1985 |
| EP | 1471708 | 10/2004 |
| EP | 1515506 | 3/2005 |
| EP | 1681844 | 7/2006 |
| EP | 1729490 | 12/2006 |
| EP | 2014020 | 1/2009 |
| EP | 2056640 | 5/2009 |
| WO | WO 98/44693 | 10/1998 |
| WO | WO 99/41876 | 8/1999 |
| WO | WO 2007/124577 | 11/2007 |
| WO | WO 2007/131296 | 11/2007 |

OTHER PUBLICATIONS

U.S. Appl. No. 12/486,605, filed Jun. 17, 2009, Michaelis, et al.
U.S. Appl. No. 12/430,697, filed Apr. 27, 2009, Michaelis, et al.
U.S. Appl. No. 12/426,023, filed Apr. 17, 2009, Michaelis, et al.
U.S. Appl. No. 12/433,334, filed Apr. 30, 2009, Brinkmann, et al.
U.S. Appl. No. 12/548,271, filed Aug. 26, 2009, Michaelis, et al.
U.S. Appl. No. 12/361,950, filed Jan. 29, 2009, Michaelis, et al.
U.S. Appl. No. 12/371,065, filed Feb. 13, 2009, Michaelis, et al.
Azuri, "Edgewater Networks, Inc. Announces Extension of VoIP Failover Capabilities at the Enterprise Edge", http://74.125.95.104/search?q=cache:JgCKutpPN7g:voipservices.tmcnet.com/feature/article, Nov. 16, 2007, printed on Dec. 3, 2008, pp. 1-3.
Counterpath Corporation; "Network Convergence Gateway (NCG)", Internet Article printed on Nov. 25, 2008 from http://www.counterpath.com/network-convergence-gateway-ncg.html; 2 pages.
Federal Register vol. 73, No. 139 Friday, Jul. 18, 2008, "Rules and Regulations", pp. 41258-41259.
Gurock, et al., "Selecting the Right License Strategy for your Software", printed on Jul. 25, 2009, from the Internet at http://blog.gurock.com/articles/selecting-the-right-license-strategy-for-your-software, 6 pages.
"Indepth: Jitter", VoIP Troubleshooter website, available at http://www.voiptroubleshooter.com/indepth/jittersources.html, accessed on Oct. 22, 2009, pp. 1-8.
Stevenson; "F/MC Watch: MobileSTICK a Silver Lining for Mobile Operators"; Internet Article printed on Feb. 6, 2009 from http://www.voipplanet.com/solutions/article.php/3670276; 6 pages. dated Apr. 7, 2007.
Webopedia; What is jitter buffer?—A Word Definition for the Webopedia Computer Dictionary; printed from http://www.webopedia.comITERM/J/jitter_buffer.html on Mar. 10, 2009; 6 pages.
Wikipedia; "Network switching subsystem"; Internet Article printed on Feb. 6, 2009 from http://en.wikipedia.org/wiki/Home_Location_Register; 10 pages.
Wikipedia; "Subscriber Identity Module"; Internet Article printed on Feb. 6, 2009 from http://en.wikipedia.org/wiki/Subscriber_Identity_Module; 8 pages.
Wikipedia; Jitter—From Wikipedia, the free encyclopedia; printed from http://en.wikipedia.org/wiki/Jitter on Mar. 10, 2009; 6 pages.
Wikipedia "H.323", http://en.wikipedia.org/w/index.php?title=H.323&printable=yes, Dec. 18, 2008, 14 pages.
Wikipedia "RTP Control Protocol"; http://en.wikipedia.org/w/index.php?title=RTP_Control_Protocol&pr... Jan. 9, 2009, 3 pages.
Wikipedia "Voice over Internet Protocol"; http://en.wikipedia.org/wiki/Voice_overinternet_Protocol Jan. 23, 2009, 15 pages.
Wikipedia "H.245"; http://en.wikipedia.org/wiki/H.245 Nov. 9, 2009, 1 page.
Hahn N: "Dialog Via Internet Call Center" Nachrichtentechnik Elektronik, Veb Verlag Technik. Berlin, DE, vol. 48, No. 4, Jul. 1, 1998 pp. 17-19, XP000784128, ISSN: 0323-4657.
Background of the Invention for the above captioned application (previously provided).
European Search Report and Opinion for European Patent Application No. 08014903.2, mailed Jun. 10, 2009.
Official Action for European Patent Application No. 08014903.2, mailed Apr. 1, 2010.
Official Action for European Patent Application No. 08014903.2, dated May 5, 2011.

* cited by examiner

METHOD AND APPARATUS FOR CREATING SECURE WRITE-ENABLED WEB PAGES THAT ARE ASSOCIATED WITH ACTIVE TELEPHONE CALLS

FIELD OF THE INVENTION

The invention relates generally to telecommunication systems and more specifically to the ad-hoc creation of new communication channels during a telephone call to enable the use of multiple media types.

BACKGROUND OF THE INVENTION

Telephone technology has greatly affected the way in which people communicate and the way that business is conducted. People have become accustomed to being able to speak with someone across an ocean or across town by simply picking up the phone and dialing. One problem with traditional telephone technology is that it is tied to a single media type, namely voice. This can result in misunderstandings occurring over the telephone, since the only way the participants can communicate is with their voice. Often, especially in the business setting, telephone call participants may want to share information via a medium other than voice.

Video calls and conferencing has helped address this issue. A problem still remains in that if one of the participants is not using a videophone, then the availability of the video medium is meaningless. Also, a participant to a call may not realize that a second medium is desirable until after the call is already in progress. Once this realization is made the participant may have to ask all of the other participants to abort the current call and initiate a new call where each participant uses their respective video enabled phone. This is clearly an inconvenience to all call participants.

Some technologies have been developed with multi-media capabilities. Such technologies, like the video phone, require the user to determine a priori that more than one medium will be desired and they will therefore be using the specialized technology. Examples of such multi-media technologies that are currently available include a variety of Instant Messaging (IM) applications, WebEX™, Skype™, and MicroSoft Net Meeting™. None of the current solutions, however, provide a simple one-click spur-of-the-moment way to add multi-media support to a traditional in-progress telephone call.

SUMMARY OF THE INVENTION

These and other needs are addressed by various embodiments and configurations of the present invention. The present invention is directed generally to creating a secondary communication channel during a telephone call and associating such a newly created communication channel with the telephone call such that the participants to the telephone call can share information with different media types. In one embodiment, a method is provided that comprises:

establishing a communication session for a first media type using a first application;

during the communication session, determining that a second media type different from the first media type is desired;

establishing a second communication channel for the second media type using a second application; and associating the second communication channel with the communication session.

In accordance with at least some embodiments of the present invention the first media type may correspond to voice and the second media type may correspond to any other known media type. For example, the second application may correspond to a web-based application in which case the second media type may include any media that can be conveyed via a web site.

The first and second communication channels may be used to carry information between the same endpoints, if such endpoints are enabled to support communications via the two media types associated with the communication channels.

The second application, and thus the second communication channel, may be used to enhance the communication session in a number of different ways. For instance, the participants to the communication channel may determine that the second media type is desirable to share additional data or convey additional ideas in formats other than those supported by the first media type. As another example, the second communication channel may be used in connection with maintaining the security of data transmitted during the communication session. More specifically, encryption keys for the encryption/decryption of messages transmitted during the communication session may be dynamically negotiated over the second communication channel. The separation of the second communication channel allows the negotiation to occur over a secure link whereas the messages transmitted during the communication session are encrypted and sent over an untrusted network.

Association of the second communication channel with the communication session can occur in a variety of ways. For example, association can occur by restricting access to the second communication channel to participants of the communication session (e.g., only allowing communication session participants to access the second communication channel), creating access restrictions to the second communication channel that are based on information associated with the communication session (e.g., providing each communication session participant with an authorization key during call setup and then securing the second communication channel with the authorization key), creating a link to the second communication channel based on information associated with the communication session (e.g., creating a URL for the second communication channel that in some way incorporates information unique to the communication session), and using the second communication channel to negotiate encryption keys for the communication session.

It is thus one aspect of the present invention to enhance a communication session being conducted in a first media type by creating a second communication channel that is separate from the communication channel initially used for the communication session but associated with the communication session in some form or another.

It is another aspect of the present invention to provide such an enhanced communications session for point-to-point calls between two endpoints as well as to provide similar enhanced communication sessions for conference call participants (e.g., for calls between three or more participants communicating on three or more endpoints). In the conference call environment, the endpoints may be conferenced via a conference bridge that is separate from the endpoints or one of the endpoints may serve as the conference point.

It is yet another aspect of the present invention to afford communication session participants the ability to create a second (or third, fourth, etc.) communication channel and associate the newly created channel with the communication session in an ad-hoc fashion during the communication session.

These and other needs are addressed by the various embodiments and configurations of the present invention. The present invention can provide a number of advantages depending on the particular configuration. These and other advantages will be apparent from the disclosure of the invention(s) contained herein.

The term "application" refers to any type of mechanism that utilizes the capabilities of a computer, processor, computing platform, server, or other type of hardware device on which it resides to execute a task that a user or some other requesting agent wishes to perform.

The phrases "at least one", "one or more", and "and/or" are open-ended expressions that are both conjunctive and disjunctive in operation. For example, each of the expressions "at least one of A, B and C", "at least one of A, B, or C", "one or more of A, B, and C", "one or more of A, B, or C" and "A, B, and/or C" means A alone, B alone, C alone, A and B together, A and C together, B and C together, or A, B and C together.

The term "a" or "an" entity refers to one or more of that entity. As such, the terms "a" (or "an"), "one or more" and "at least one" can be used interchangeably herein. It is also to be noted that the terms "comprising", "including", and "having" can be used interchangeably.

The term "automatic" and variations thereof, as used herein, refers to any process or operation done without material human input when the process or operation is performed. However, a process or operation can be automatic even if performance of the process or operation uses human input, whether material or immaterial, received before performance of the process or operation. Human input is deemed to be material if such input influences how the process or operation will be performed. Human input that consents to the performance of the process or operation is not deemed to be "material".

The term "computer-readable medium" as used herein refers to any tangible storage and/or transmission medium that participate in providing instructions to a processor for execution. Such a medium may take many forms, including but not limited to, non-volatile media, volatile media, and transmission media. Non-volatile media includes, for example, NVRAM, or magnetic or optical disks. Volatile media includes dynamic memory, such as main memory. Common forms of computer-readable media include, for example, a floppy disk, a flexible disk, hard disk, magnetic tape, or any other magnetic medium, magneto-optical medium, a CD-ROM, any other optical medium, punch cards, paper tape, any other physical medium with patterns of holes, a RAM, a PROM, and EPROM, a FLASH-EPROM, a solid state medium like a memory card, any other memory chip or cartridge, a carrier wave as described hereinafter, or any other medium from which a computer can read. A digital file attachment to e-mail or other self-contained information archive or set of archives is considered a distribution medium equivalent to a tangible storage medium. When the computer-readable media is configured as a database, it is to be understood that the database may be any type of database, such as relational, hierarchical, object-oriented, and/or the like. Accordingly, the invention is considered to include a tangible storage medium or distribution medium and prior art-recognized equivalents and successor media, in which the software implementations of the present invention are stored.

The terms "determine", "calculate" and "compute," and variations thereof, as used herein, are used interchangeably and include any type of methodology, process, algorithm, mathematical operation or technique.

The term "module" as used herein refers to any known or later developed hardware, software, firmware, artificial intelligence, fuzzy logic, or combination of hardware and software that is capable of performing the functionality associated with that element. Also, while the invention is described in terms of exemplary embodiments, it should be appreciated that individual aspects of the invention can be separately claimed.

The preceding is a simplified summary of the invention to provide an understanding of some aspects of the invention. This summary is neither an extensive nor exhaustive overview of the invention and its various embodiments. It is intended neither to identify key or critical elements of the invention nor to delineate the scope of the invention but to present selected concepts of the invention in a simplified form as an introduction to the more detailed description presented below. As will be appreciated, other embodiments of the invention are possible utilizing, alone or in combination, one or more of the features set forth above or described in detail below.

DETAILED DESCRIPTION

The invention will be illustrated below in conjunction with an exemplary communication system. Although well suited for use with, e.g., a system using a server(s) and/or database(s), the invention is not limited to use with any particular type of communication system or configuration of system elements. Those skilled in the art will recognize that the disclosed techniques may be used in any telephony application in which it is desirable to share data via multiple media types.

The exemplary systems and methods of this invention will also be described in relation to analysis software, modules, and associated analysis hardware. However, to avoid unnecessarily obscuring the present invention, the following description omits well-known structures, components and devices that may be shown in block diagram form, are well known, or are otherwise summarized.

For purposes of explanation, numerous details are set forth in order to provide a thorough understanding of the present invention. It should be appreciated, however, that the present invention may be practiced in a variety of ways beyond the specific details set forth herein.

Figure 1A:
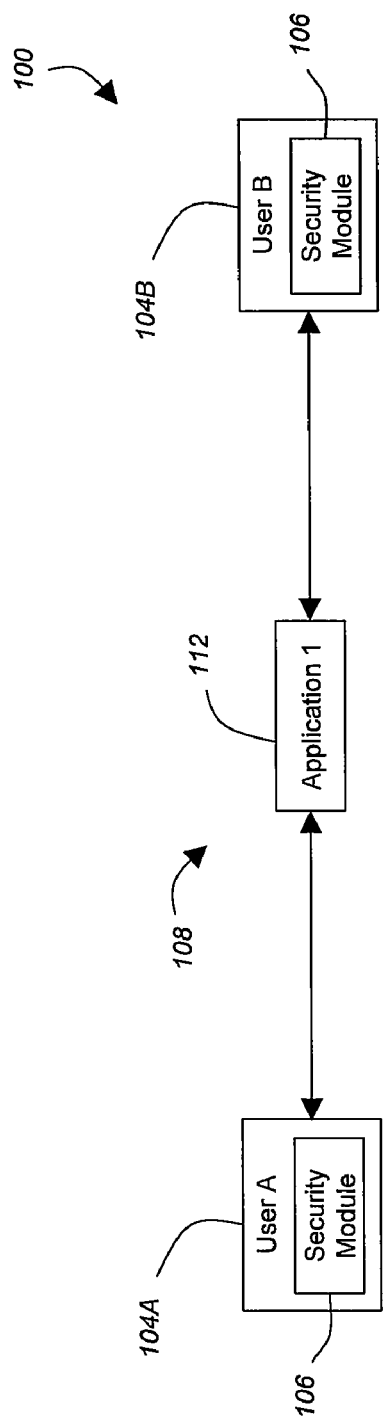
FIG. 1A is a block diagram depicting users communicating via a first communication channel in accordance with at least some embodiments of the present invention.
Figure 1B:
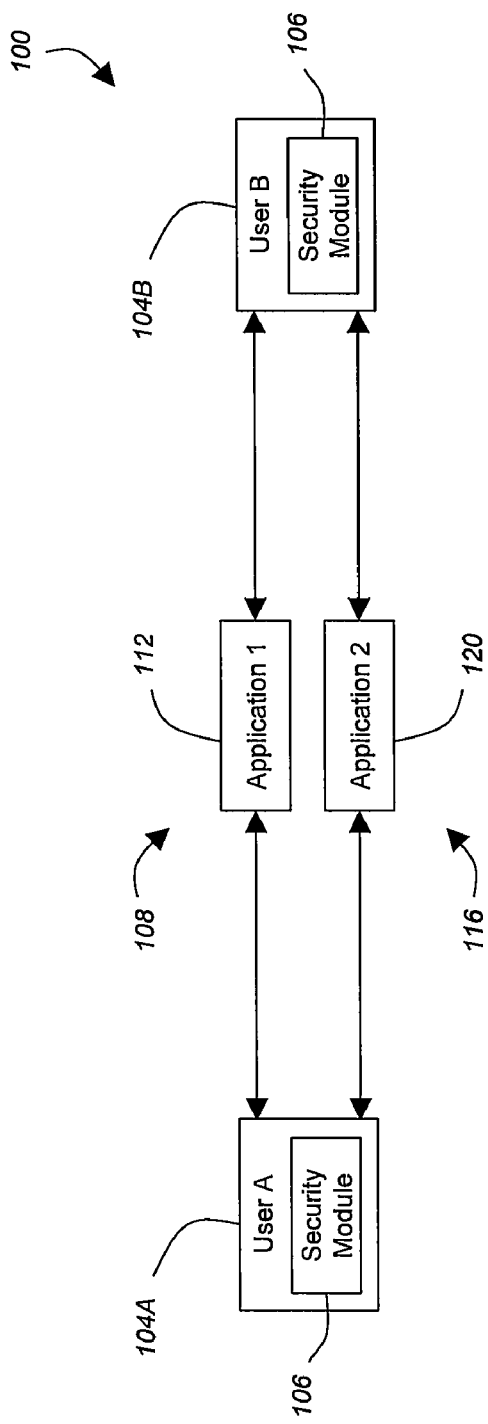
FIG. 1B is a block diagram depicting users communicating via a first and second communication channel in accordance with at least some embodiments of the present invention.

Referring now to FIGS. 1A and 1B, an exemplary communication session between two users 104 will be described in accordance with at least some embodiments of the present invention. A communication session may initially be established between a first user 104A and a second user 104B via a first communication channel 108. The first communication channel 108 may be adapted to allow the users 104 to communicate with a first media type. Communications via the first media type may be facilitated by a first application 112 residing somewhere between the users 104 on the first communication channel 108. For instance, the users 104 may initially communicate with one another over a telephone system using voice communications. In such an example, the first application 112 may correspond to the various call routing devices (e.g., routers, switches, voice servers, audio servers, etc.) that transfer voice signals from the first user 104A to the second user 104B and vice versa. Alternatively, the first application 112 may correspond to a text-type application (e.g., Instant Messaging (IM), email, Short Message Service (SMS) messaging, Multimedia Messaging Service (MMS) messaging, etc.) that allows the users 104 to communicate via text as a first media type. The first application 112 may also correspond to a video conferencing application, in which case the first media type is video.

As the users 104 are engaging in their communication session it may become desirable to introduce a second media type. However, the first application 112 is only set up to facilitate communications via the first media type. Accordingly, as can be seen in FIG. 1B, a second communication channel 116 is established whereby the users 104 are allowed to utilize a second media type in the communication session. The second media type may be provided by a second application 120 that is different from the first application 112. In one exemplary embodiment, the second application 112 may correspond to a web-based application that can provide web content for editing/viewing by the users 104.

The second channel 116 may be established in an ad-hoc fashion while the communication session is in progress on the first channel 108. After the first channel 116 has been established it may be associated with the communication session by either referencing some unique identification information about the communication session, its participants (e.g., users 104A and 104B), or by sending the participants access information for the second communication channel 116 via the first channel 108. An example of the last type of association may include providing a website link for the second communication channel 116 to each of the users 104A and 104B via the first communication channel 108. More specifically, the website address or Universal Resource Locator (URL) may be provided to the users 104A and 104B in a format supported by the first application 112.

The users 104 may also be optionally provided with a security module 106 that can utilize data transferred via the second communication channel 116 to protect data transmitted via the first communication channel 108. More specifically, the security module 106 associated with each user 104 may be adapted to dynamically negotiate new encryption keys for the communication session. The negotiation of the encryption keys may occur over the second communication channel 116 and once a new encryption key has been agreed upon, the security module 106 may cause communications over the first communication channel 108 to be encrypted with the newly negotiated key. The security module 106 may be adapted to re-negotiate encryption keys multiple times for the same communication session, thereby increasing the security of communications between the users 104.

In implementation, the security module 106 may be integral to the communication device that the user 104 is employing to communicate on the first communication channel 108. Alternatively, the security module 106 may comprise a separate element that is adapted to extract encryption negotiation information from the second communication channel 116 as other data is transmitted to the user 104 via the second communication channel. In other words, the security module 106 may be provided as a separate element to the communication device that the user 104 is using to communication via the first 108 or second 116 communication channel or may be provided as an integral element (i.e., either software or hardware) to the communication device itself.

Although the communication channels 108, 116 are depicted as separate lines of communication, it should be appreciated that both communication channels 108, 116 may be carried on a common medium. For instance, both communication channels 108, 116 may be provided to a user 104 over a single telephone line, a single cellular or other type of Radio Frequency (RF) signal, a single Ethernet line, a single coaxial cable, or a single DSL connection. Of course, however, a single common medium is not required to carry both communication channels 108, 116. For example, the first communication channel 108 may be carried over the PSTN to the user 104 via a traditional telephone line whereas the second communication channel may be provided over the Internet to the user 104 via a wireless connection.

Additionally, one skilled in the art will appreciate that embodiments of the present invention described herein can be easily adapted for a conference configuration (e.g., a communication session comprising three or more participants). Thus, although most embodiments of the present invention will be described with reference to a point-to-point communication session (e.g., a communication session comprising two participants), the present invention is not limited to such a configuration. Moreover, the necessary adaptations to enable a conference configuration will become readily apparent to one skilled in the art after reading the present disclosure.

Figure 2A:
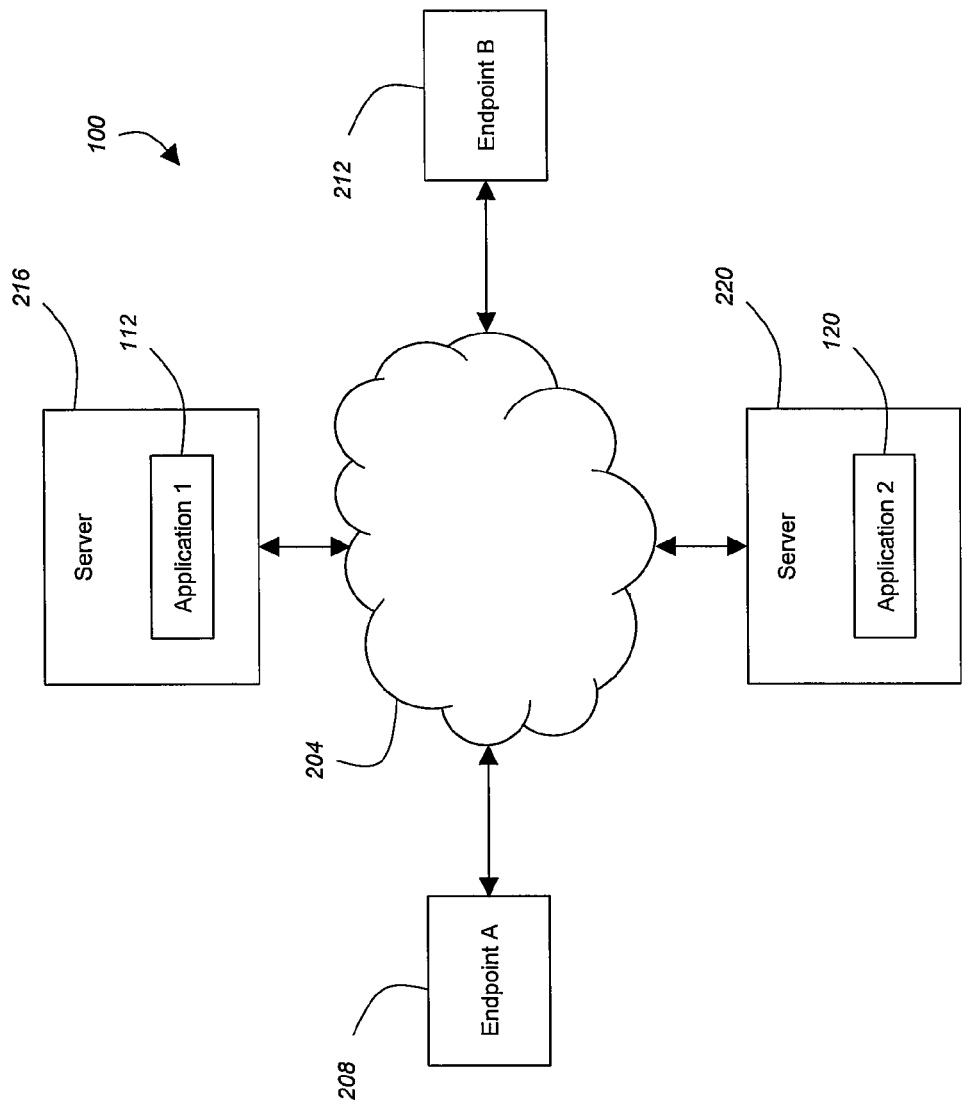
FIG. 2A is a block diagram depicting a first communication system configuration in accordance with at least some embodiments of the present invention.
Figure 2B:
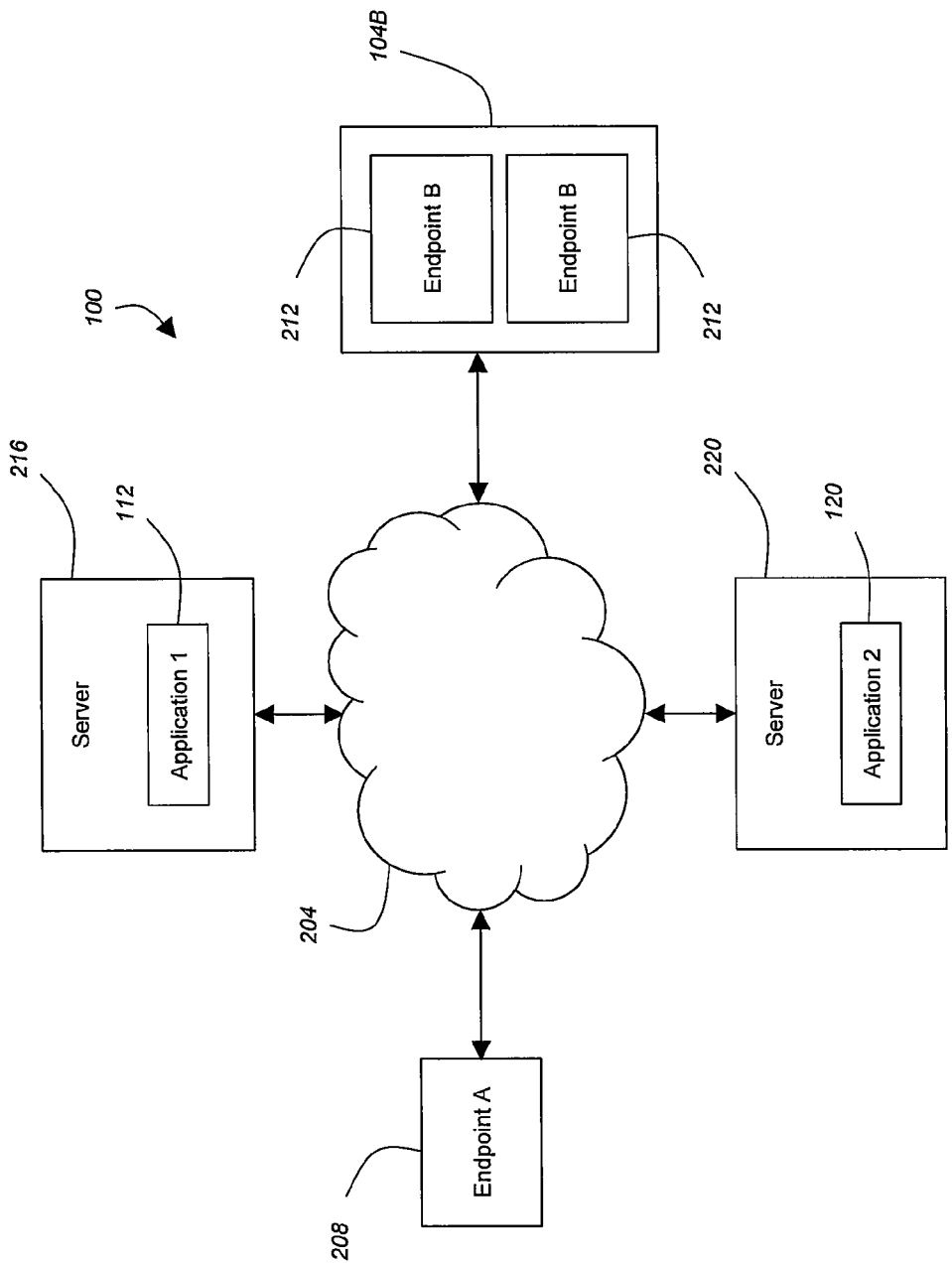
FIG. 2B is a block diagram depicting a second communication system configuration in accordance with at least some embodiments of the present invention.
Figure 2C:
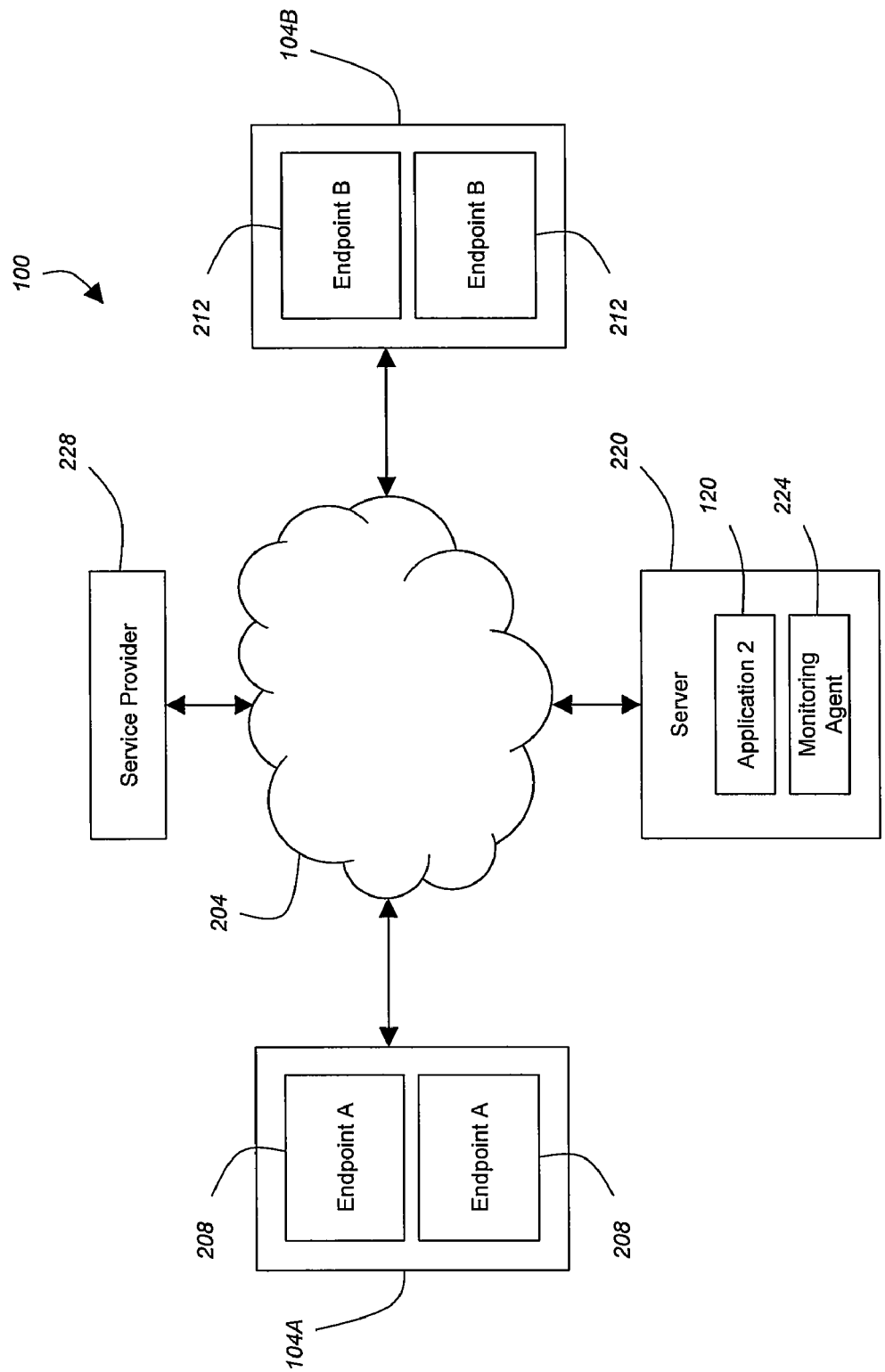
FIG. 2C is a block diagram depicting a third communication system configuration in accordance with at least some embodiments of the present invention.

Referring now to FIGS. 2A-2C various communication system 100 configurations will be described in accordance with at least some embodiments of the present invention. A first possible configuration is depicted in FIG. 2A where a communication network 204 may connect the users 104, each of which are using a single endpoint 208, 212 to communicate with one another. In this particular embodiment, the endpoints 208, 212 may correspond to Session Initiation Protocol (SIP) enabled devices that are capable of accessing both the first 112 and second 120 applications. In other words, the endpoint 208, 212 may be utilized to communicate via the first communication channel 108 and the second communication channel 116. Other suitable types of endpoints 208, 212 that may be employed by a user 104 to communicate via both communication channels 108, 112 include, without limitation, phones operated via a computer Graphical User Interface (GUI), Voice over IP (VoIP) phones, and the like. Such endpoints 208, 212 that are capable of communicating via both communication channels 108, 116 are generally referred to herein as "intelligent endpoints."

In accordance with at least some embodiments of the present invention, the communication network 204 may correspond to any collection of communication elements that are capable of transferring signals between the endpoints 208, 212. The communication network 204 may include any type of information transportation medium and may use any type of protocols to transport messages between endpoints. The Internet is an example of the communication network 204 that constitutes an IP network consisting of many computers and other communication devices located all over the world, which are connected through many telephone systems and other means. Other examples of the communication network 204 include, without limitation, a standard Plain Old Telephone System (POTS), an Integrated Services Digital Network (ISDN), the Public Switched Telephone Network (PSTN), a Local Area Network (LAN), a Wide Area Network (WAN), a cellular communications network, and any other type of packet-switched or circuit-switched network known in the art. The communication network 204 may include wired and/or wireless communication technologies.

The applications 112, 120 may reside on various servers 216, 220 that are also connected to the communication network 204. The first application 112 may reside on a first server 216 while the second application 120 resides on a second different server 220. Of course, both applications 112, 120 may reside on a common server in certain embodiments of the present invention. As an example, the first application 112 may correspond to a SIP call control application and, thus, the first server 216 may include a SIP applications server that is capable of providing SIP functionality to the endpoints 208, 212. The first application 112 may alternatively correspond to any other type of voice-based application.

The second application 120 may include a web-based application, in which case the second server 220 may include a web server or the like. The second application 120 may be adapted to create web pages during a communication session in response to receiving a request from either the first server 216 or one of the endpoints 208, 212. The second application 120 may then associate the dynamically created web page with the communication session already in progress.

Referring now to FIG. 2B, a second possible communication system 100 configuration will be described in accordance with at least some embodiments of the present invention. This particular configuration may include having the first user 104A connected to the communication network 204 via a single communication endpoint 208 while the second user 104B is connected to the communication network 204 via two communication endpoints 212. The endpoint 208 associated with the first user 104A may be similar to the previously described endpoints. The endpoints 212 associated with the second user 104B, on the other hand, may only be capable of supporting a certain media type. More specifically, the second user 104B may utilize the first endpoint 212 to communicate via the first communication channel 108 and separately utilize the second endpoint 212 to communicate via the second communication channel 116. As an example, the second user 104B may employ both a telephone (e.g., an analog telephone) connected to the PSTN and a computer connected to the Internet to communicate with the first user 104A. The first endpoint 212 may be adapted to operate in cooperation with the first application 112 whereas the second endpoint 212 may be adapted to operate in cooperation with the second application 120. Thus, the second user 104B will be enabled to communicate with the first user 104A in a first and second media type by utilizing both endpoints 212.

Referring now to FIG. 2C, a third possible communication system 100 configuration will be described in accordance with at least some embodiments of the present invention. This configuration includes both users 104 employing two endpoints to communicate via two different media types. Each user 104 may use their respective first endpoint 208, 212 to communicate via the first communication channel 108. In this particular configuration the first application 112 may correspond to the PSTN or some other POTS and may be included in the communication network 204. The second application 120, on the other hand, may be used by each user's respective second endpoint 208, 212. The second application 120 may include a web-based application to which the endpoints connect with over the Internet. Thus, each user 104 may communicate with one another via voice using their respective first endpoints 208, 212 and may communicate with one another via some other media type using their respective second endpoints 208, 212.

As can also be seen in FIG. 2C, the communication system 100 may further include a service provider 228 as well as a monitoring agent 224 provided in connection with the second application 120. The service provider 228 may correspond to the head end of the PSTN service provider and/or a server Internet service provider. In this particular embodiment, the users 104 may request that the second application 120 is engaged to create and associate a second communication channel with the communication session that is already in progress on the PSTN, for example. In one embodiment, the first endpoints 208 of the users 104 may be simple and incapable of directly sending a request to the server 220 to engage the second application 120. Accordingly, one or both of the users 104 may send a request to the service provider 228 who is capable of sending a request to the server 220 on behalf of the users 104. The server 220 may then activate the second application 120 which creates a web page or some other content sharing mechanism and associates it with the communication session.

The server 220 may further include a monitoring agent 224 that is capable of determining and ensuring that only the participants to the associated communication session are connected or allowed to connect to the second application 120. The monitoring agent 224 may also be adapted to monitor when one of the users 104 has made new content available with the second application 220 and may further notify the other communication session participants via the first communication channel 108 that new information is available via the second communication channel 116.

Figure 3:
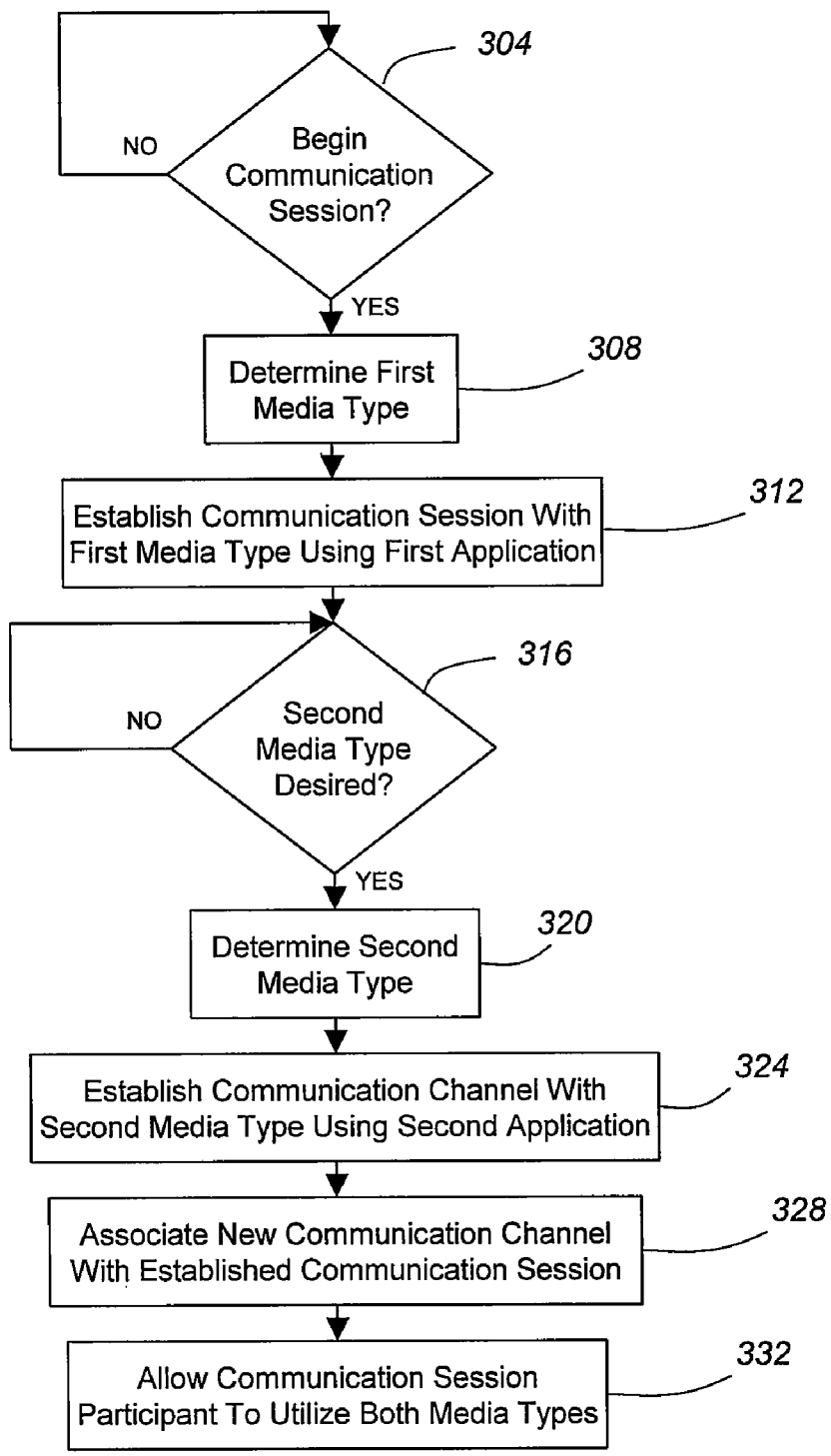
FIG. 3 is a flow diagram depicting a method of creating and associating a second communication channel with a communication session already in progress on a first communication channel in accordance with at least some embodiments of the present invention.

With reference now to FIG. 3, a method of facilitating an enhanced communication session will be described in accordance with at least some embodiments of the present invention. Initially, it is determined whether a new communications session has begun (step 304). The method remains in this step until it has been determined that a new communication session has been initiated. When the communication session has been initiated, it is determined what media type will be used as a first media type in the communication session (step 308). The first media type may correspond to a single media type such as voice, audio, text, images, or video. After the first media type has been determined, the communication session is established with the first media type using a first application 112 (step 312). Thus, the communication session is initially conducted on the first communication channel 108.

The communication session may continue in this first media type for the duration of the communication session if the users 104 involved in the communication session (i.e., the communication session participants) desire no additional media types. However, the method will continue to determine whether a second media type has been requested by one or more of the participants (step 316). If it is determined that a second media type is desired, as indicated by receiving a request by one or more of the participants, then the method continues by determining the second media type that will be used to enhance the communication session already in progress (step 320). The format of the request received from the participant may vary depending upon the type of endpoint 208, 212 being employed by that participant. In accordance with at least one embodiment of the present invention, the request may be received as a simple web-page retrieval request. Alternatively, the request may be received as a message having a predetermined format designated for such requests.

The second media type selected may also correspond to one of voice, text, image, or video, and is different from the first media type. Thus, the incorporation of a second media type to the communication session may require the use of another application (e.g., an application different from the first application 112). If a second application 120 is required to support the second media type, then the second communication channel 116 is established for the second media type using the second application 120 (step 324).

The second communication channel 116 is then associated with the already-in-progress communication session (step 328). This association may occur during creation of the second communication channel 116 (i.e., the second communication channel 116 may be created based on properties of the first communication channel 108) or may occur after the second communication channel 116 has been created. The communication channels 108, 116 may be associated in a number of different ways and the way in which they are associated may vary depending upon the nature of the communication channels 108, 116 as well as the capabilities of the respective applications 112, 120. As an illustrative example, the second communication channel 116 may correspond to a shared website that has a URL based on the first communication channel 108 properties (e.g., session identification information, session start time, service provider information, etc.) and participant properties (e.g., user names, endpoint identification information, etc.) and other identification information unique to the in-progress communication session. Alternatively, the second communication channel 116 may be associated with the first communication channel 108 by adding a security mechanism to the second communication channel 116 that is based on the first communication channel 108 properties, participant properties, or any other type of information that is unique to the first communication channel 108. Additional methods of associating the communication channels 108, 116 as described in the various examples set forth herein may also be used in this step. After the communication channels 108, 116 have been associated with one another, the communication session is allowed to continue and the participants are allowed to utilize both media types (step 332).

In accordance with at least one embodiment of the present invention, when the communication is being conducted with two separate communication channels 108, 116 that are associated with one another, one of the communication channels may be used to dynamically negotiate encryption keys that will be used for communications transmitted over the other communication channel. More specifically, the security modules 106 associated with each user's endpoint 208, 212 may continually negotiate new encryption keys over the second communication channel 116 as a background operation to the actual communication session occurring on the first communication channel 108. When a new encryption key(s) has been agreed upon by the security modules 106, the security modules 106 may cause the associated endpoint 208, 212 to begin encoding/decoding any subsequent messages with the newly agreed upon key. Such dynamic alterations of keys may be employed in encryption schemes using either symmetric-key algorithms or asymmetric key algorithms. Moreover, public and/or private keys that are used for encoding and/or decoding may be dynamically updated over the second communication channel 116 and shared with the endpoints 208, 212 through the security module 106.

Although the addition of only one new media type has been described herein, one skilled in the art will appreciate that additional communication channels may be dynamically created during the communication session and associated thereto based on the needs of the communication session participants. There is no limit to the number of separate communication channels, and media types, that may be created and added to enhance an in-progress communication session. Moreover, separate communication channels may be added to and removed from a communication session on an as-needed basis. The limits placed on the number of times that communication channels are added or removed from a communication session will only depend on the needs of the participants.

Figure 4:
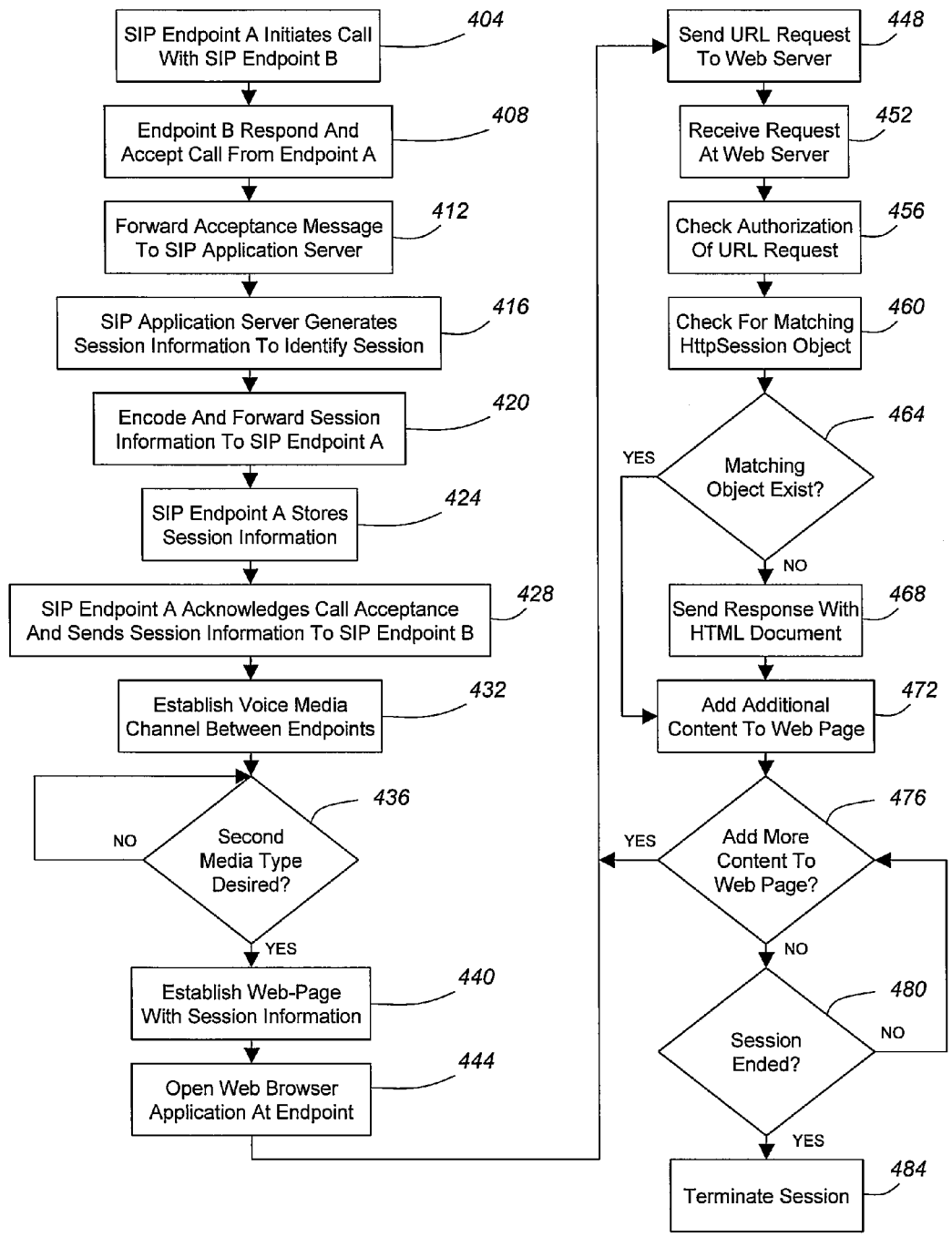
FIG. 4 is a flow diagram depicting a method of enhancing a SIP telephone call with a dynamically created web page in accordance with at least some embodiments of the present invention.

One particular example of the general method described above will now be discussed in connection with FIG. 4. This particular example may be performed when both users 104 have access to SIP enabled endpoints 208, 212. Consider a SIP telephony system, such as that depicted in connection with FIG. 2A, comprising at least two SIP endpoints 208, 212 (i.e., SIP User Agents A and B), a SIP router comprising at least a SIP proxy and a SIP B2BUA (i.e., components in the communication network 204), and a SIP Application server (e.g., the first server 216 which may correspond to the Avaya Ubiquity SIP A/S) hosting some SIP servlets (e.g., the first application 112). Consider also a standards-compliant applications server (e.g., the second server 220), and in one example a JEE A/S such as JBoss, which hosts a web application (e.g., the second application 120) that includes an http/https servlet, named WebPageShare, for creation and management of dynamic, shared web pages (e.g., HTML+ECMAScript documents) with the capability to cache and/or persist said web pages.

When the user of SIP Endpoint A initiates a call to Endpoint B, Endpoint A sends a SIP INVITE message to the SIP router directed toward Endpoint B (step 404). Upon receiving the SIP INVITE message, the SIP router's proxy function forwards the SIP INVITE message to Endpoint B. Endpoint B responds with a SIP OK message, which is sent back to the SIP router and directed toward Endpoint A (step 408). Upon receiving the SIP OK message, the router's B2BUA function forwards the SIP OK message to a SIP servlet hosted by the SIP A/S (step 412). Receipt of the SIP OK message may cause the SIP servlet to generate some session information that may be used to uniquely identify the session, such as a unique session ID, Address of Record (AOR) information for the users, endpoint identification information (e.g., IP address, telephone number, email address, extension, etc.), time of session initiation, etc. (step 416). The SIP A/S then encodes this information using Session Description Protocol (SDP), and places the SDP-encoded information in the SIP OK message header for transmission to Endpoint A (step 420). Of course, the SDP-encoded information may also be placed in the SIP message trailer, body of the SIP message, or in any other location of the SIP OK message or a separate SIP message.

In accordance with at least one embodiment, the SIP servlet may also authorize the users and/or the session with some single sign-on authorization service and thereby dual-purpose the session ID to serve as an authorization token. The SIP servlet then sends the SIP OK message back to the B2BUA, which then forwards it on to Endpoint A. Endpoint A locally stores the message header information including the SDP-encoded session description information (step 424). As a response to receiving the SIP OK message, Endpoint A may then create a SIP ACK message which includes the session description information in the header, forward the SIP ACK message to the SIP router, which then forwards the SIP ACK message to Endpoint B (step 428). A voice media channel is established (using the SDP-encoded information) by and between the two endpoints so that the users may communicate using voice (step 432). Thus, using the standard SIP call setup message exchange (i.e., INVITE-OK-ACK), both call endpoints obtain a unique session ID and an authorization token. Note that for security purposes, the call setup may use SIPS addressing and thereby ensure the use of secure transport protocols (so that, e.g., the session ID/authorization token is not sent in the clear over the underlying network). The users are then free to engage in their communication session using the first media type (i.e., voice).

At some point during the communication session, either user may decide to associate a shared web page with the session to use as an additional media channel for sharing text, content such as image, graphic, audio, and video files, etc (step 436). Each SIP Endpoint's user interface may include a clickable button labeled, e.g., "Open a shared web page". Each SIP Endpoint may also have been configured with the URL of the web application's servlet for dynamic web page creation and management, e.g., www.avaya.com/internal/webpageshare/ (assuming that the servlet WebPageShare has been mapped to the path internal/webpageshare by, for example, the web.xml file used by a JEE A/S to configure a web application's runtime environment). When the button is clicked by either user, or any other confirmation has been received that a second media type is desired, a web browser application (such as Microsoft Internet Explorer, Mozilla Firefox, Apple Safari, etc.) is launched by the SIP Eendpoint (step 444), and then an http GET request is issued containing the servlet path URL with the session ID/authorization token as a parameter value associated with the in-progress communication session (step 448). One example of such a servlet path URL may include www.avaya.com/internal/webpagseshare?sessionID=9eqhg1976542ajfhquhfq347. In accordance with at least some embodiments of the present invention, https may be used to ensure that the parameter value is not sent in the clear (assuming that the WebPageShare servlet is an https servlet).

When the WebPageShare servlet first receives the request (step 452), it may check the authorization of the request using the authorization token that was previously issued in connection with the SDP-encoded information (step 456). After the validity of the authorization has been confirmed the servlet checks if there is an existing HttpSession object identified by the sessionID either in local cache or in persistent store (the HttpSession class is part of the JEE A/S Java servlet specification and may be used to store information, such as media content, associated with the session) (step 460). It is then determined if a matching object exists based on the received sessionID (step 464). If this is the first time the servlet has seen a request with this particular URL, then there will not be an HttpSession object for the session, so the servlet creates one with the object's sessionID attribute set to the sessionID value in the URL and then the WebPageShare servlet creates a response containing an HTML document which it dynamically generates (step 468). The HTML document may include forms for, e.g., capturing text content, uploading content files, etc., and may also include HTML for displaying content that is contained in the session's HttpSession object. The HTML document may also included ECMAScript, e.g. JavaScript, that instructs a web browser to automatically poll the servlet for media content updates. As a part of this step, when the servlet finishes creating the response document, it sends a response back to the requesting browser.

After the initial http GET request that generates the HttpSession object, browser instances at each Endpoint may continue to issue http GET requests containing the URL www.avaya.com/internal/webpagseshare?sessionID=9eqhg1976542ajfhquhfq347, either by the user pushing the "Open a shared web page" or by the browser executing the automatic polling script. By using an AJAX methodology, the web page updating process may be made efficient by only transmitting new/updated information. Users may also add media content to the web page using their browser application, e.g., by entering text into a form, and then clicking a button that issues an http POST request, which the WebPageShare servlet processes by storing the uploaded media content in the HttpSession object (step 472). This way, both users may share content through a web page, with the degree of interactivity determined by the frequency, or inversely the period or latency, of the polling or manual button clicking. Then, in step 476, it is determined if one or more users want to add more content to the web page. If so, then another URL request is sent to the web server (step 448). If not, then it is determined whether the session has ended (step 480). When the users decide to terminate the session, another http request with the URL, e.g., www.avaya.com/internal/webpagseshare?sessionID=9eqhg1976542ajfhq-uhfq347?action=terminate, which may be sent to the WebPageShare servlet by either a browser or a SIP endpoint (step 484). In this step, the WebPageShare servlet may process this request by persistently storing the session's HttpSession object. The users may save the URL information for future reference, and then at a later time may point a browser to www.avaya.com/internal/webpagseshare?sessionID=9eqhg1976542ajfhquhfq347 and thereby not only retrieve the media content of the session but also reinitiate the session and continue to add more media content.

Figure 5:
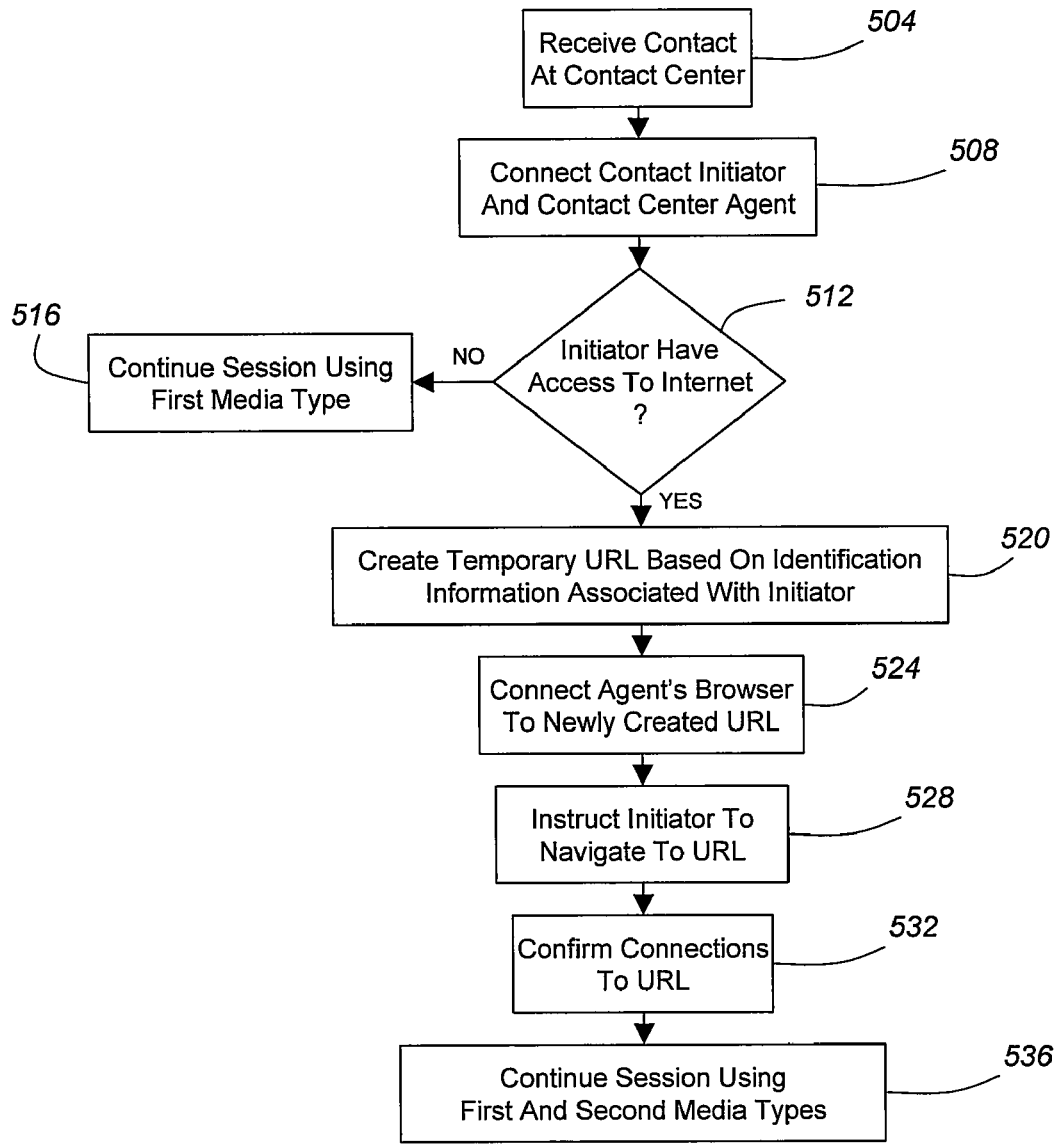
FIG. 5 is a flow diagram depicting a method of enhancing a telephone call between an advanced communication device and a simple communication device with a dynamically created web page in accordance with at least some embodiments of the present invention.

Another example of the general method described above will now be discussed in connection with FIG. 5. This particular example may be performed when one of the users 104 has access to an endpoint 208, 212 that is capable of working in cooperation with two different applications 108, 120 and another user 104 does not have access to such an endpoint 208, 212. For example, assume that a user 104 is a contact center agent for XYZ Corp. and she has access to a desktop PC and an H.323 telephone. The method is initiated when the contact center receives a contact, such as a voice call, that originates on the PSTN from a customer, whose caller ID is shown as 303-555-1234 (step 504). The contact center agent is then connected with the contact initiator (step 508). The contact center agent may then inquire whether the initiator has access to the Internet or some other transport media capable of supporting a second media type (i.e., a media type other than voice) (step 512). If the initiator does not have access to the Internet, then the communication session continues with both parties using the first media type only (step 516).

If, on the other hand, the contact initiator does have access to the Internet, then the contact center agent may create a temporary URL based on identification information associated with the initiator (step 520). For example, the contact center agent may press a number or predetermined sequence of numbers on her telephone which causes a temporary URL to be created having the initiator's phone number incorporated therein. For example, a URL such as www.xyz.com/303-555-1234 may be dynamically created by a second application 120 (e.g., a web application) in response to receiving a create URL request from the contact center agent. The contact center agent's browser on the PC may be automatically directed to the newly created URL (step 524). Then the contact center agent may instruct the initiator to navigate their respective web browser to the same newly created URL (step 528). In other words, the contact center agent may tell the initiator the URL information for the website. The initiator can then tell the contact center agent when they have successfully reached the newly created web page.

The contact center agent can then confirm that all of the permitted and necessary connections have been made with the website (step 532). In this particular step, security to the website may be ensured by the contact center agent because the server which created the website is permitted to allow only X number of simultaneous logins to the web page, where X equals the number of parties on the telephone call (e.g., that are in communication via the first communication channel 108). Therefore, if the contact center agent and the initiator are connected to the website and X equals 2, then the contact center agent can confirm that no other unauthorized parties are viewing the web page. Once the contact center agent has confirmed that the security of the web page, then the communication session can continue using both the first and second media types (step 536). More specifically, the initiator and contact center agent may continue to talk over the phone while also sharing information over the newly created web page.

Figure 6:
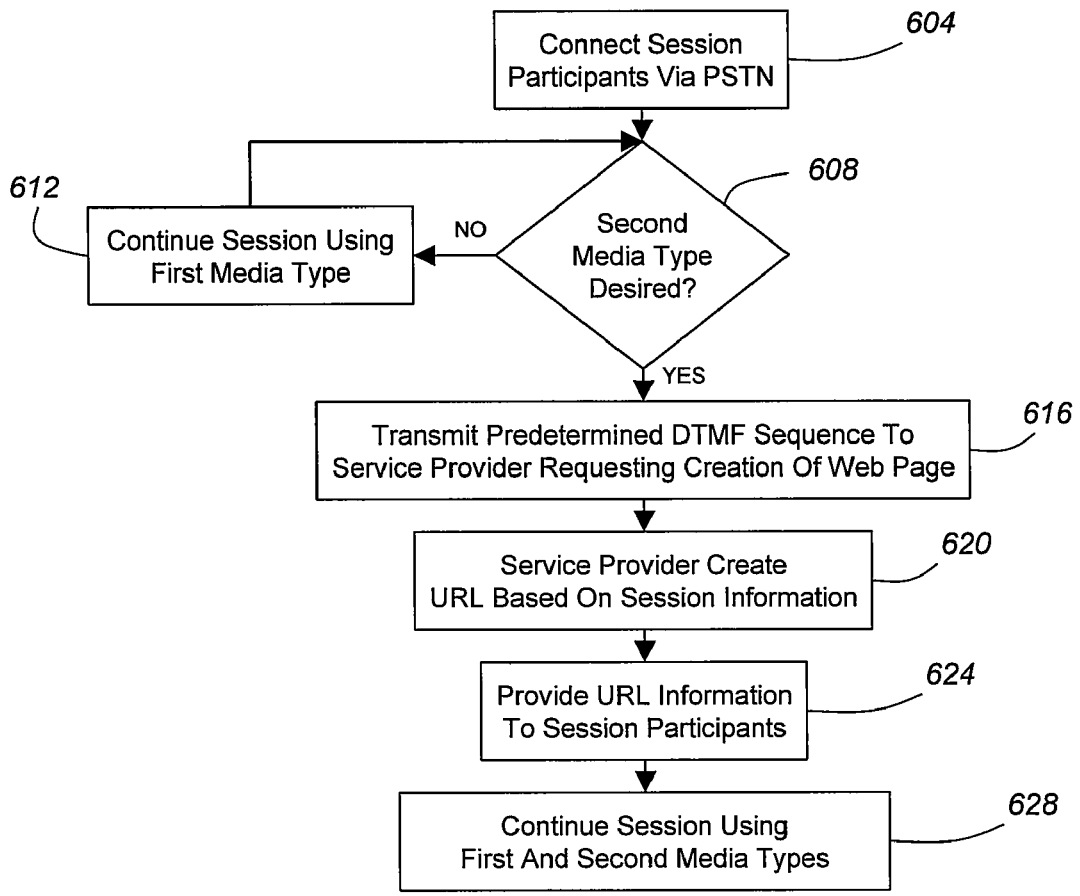
FIG. 6 is a flow diagram depicting a method of enhancing a telephone call between two simple communication devices with a dynamically created web page in accordance with at least some embodiments of the present invention.

Yet another example of the general method described above will now be discussed in connection with FIG. 6. This particular example may be performed when both of the users 104 are initially communicating over the PSTN using analog telephones. The method begins when the users 104 are connected over the PSTN and begin engaging in the communication session (step 604). As the communication session progress, it is determined whether a second media type is desired (step 608). This determination may be made based on whether or not a request is received from one or more users 104 to add another media type. If no request is received, then the communication session continues with only the first media type (step 612).

If a second media type is desired by one of the users, then the method continues with one or more of the users 104 transmitting a predetermined DTMF sequence to the service provider 228 (step 616). The predetermined DTMF sequence may correspond to a series of DTMF tones being transmitted in a predefined order or to transmission of a single DTMF tone. The predetermined sequence of DTMF tones may correspond to a request to create a web page.

Upon receiving the predetermined DTMF sequence, the service provider 228 may submit a request to the second server 220 to create a URL based on communication session information (step 620). The URL may incorporate some unique aspect of the communication session such as the user's phone number(s), the time the request was received, the predetermined DTMF sequence, or any other information unique to the communication session. Once the server 220 has created the web page, the URL information for the newly created web page is shared with the communication session participants by a voice announcement over the first communication channel 108 and/or in a text transmission to addresses associated with the users (e.g., in an email to each user's email address which is known for each user, in a text message to each user's cellular phone, in an IM message to each user's IM account, etc.) (step 624). Thereafter, the user's 104 are free to continue the communication session using both the first and second media types (step 628).

As still another example, a first user may be unable to hear adequately on a telephone, but is able to speak clearly. That user may need to ask a second user a question. Unfortunately, the second user may not have access to a TTY machine. In such a situation, the first user can place a call to the second user, cause a web page to be created specifically for that phone call (e.g., by incorporating some call information into the web page address or security access permissions) and then ask the second user to respond to questions by typing into a text-entry field in the newly created web page.

While the above-described flowchart has been discussed in relation to a particular sequence of events, it should be appreciated that changes to this sequence can occur without materially affecting the operation of the invention. Additionally, the exact sequence of events need not occur as set forth in the exemplary embodiments. The exemplary techniques illustrated herein are not limited to the specifically illustrated embodiments but can also be utilized with the other exemplary embodiments and each described feature is individually and separately claimable.

The systems, methods and protocols of this invention can be implemented on a special purpose computer in addition to or in place of the described communication equipment, a programmed microprocessor or microcontroller and peripheral integrated circuit element(s), an ASIC or other integrated circuit, a digital signal processor, a hard-wired electronic or logic circuit such as discrete element circuit, a programmable logic device such as PLD, PLA, FPGA, PAL, a communications device, such as a server, personal computer, any comparable means, or the like. In general, any device capable of implementing a state machine that is in turn capable of implementing the methodology illustrated herein can be used to implement the various communication methods, protocols and techniques according to this invention.

Furthermore, the disclosed methods may be readily implemented in software using object or object-oriented software development environments that provide portable source code that can be used on a variety of computer or workstation platforms. Alternatively, the disclosed system may be implemented partially or fully in hardware using standard logic circuits or VLSI design. Whether software or hardware is used to implement the systems in accordance with this invention is dependent on the speed and/or efficiency requirements of the system, the particular function, and the particular software or hardware systems or microprocessor or microcomputer systems being utilized. The analysis systems, methods and protocols illustrated herein can be readily implemented in hardware and/or software using any known or later developed systems or structures, devices and/or software by those of ordinary skill in the applicable art from the functional description provided herein and with a general basic knowledge of the communication and computer arts.

Moreover, the disclosed methods may be readily implemented in software that can be stored on a storage medium, executed on a programmed general-purpose computer with the cooperation of a controller and memory, a special purpose computer, a microprocessor, or the like. In these instances, the systems and methods of this invention can be implemented as program embedded on personal computer such as an applet, JAVA® or CGI script, as a resource residing on a server or computer workstation, as a routine embedded in a dedicated communication system or system component, or the like. The system can also be implemented by physically incorporating the system and/or method into a software and/or hardware system, such as the hardware and software systems of a communications device or system.

It is therefore apparent that there has been provided, in accordance with the present invention, systems, apparatuses and methods for creating secure write-enabled web pages and associating such pages with an in-progress telephone call. While this invention has been described in conjunction with a number of embodiments, it is evident that many alternatives, modifications and variations would be or are apparent to those of ordinary skill in the applicable arts. Accordingly, it is intended to embrace all such alternatives, modifications, equivalents and variations that are within the spirit and scope of this invention.

What is claimed is:

1. A method, comprising:
   establishing a communication session between a plurality of participants for a first media type using a first application;
   after initiation of and during the communication session, determining that a second media type different from the first media type is desired;
   establishing a second communication channel for the second media type using a second application; and
   associating the second communication channel with the communication session, wherein the second communication channel is associated with the communication session by creating a link to the second communication channel based on information associated with the communication session, the link being dynamically created and incorporating information unique to the communication session, the link being to one or more dynamically-created write-enabled web pages for editing or viewing by the participants.

2. The method of claim 1, wherein associating the second communication channel with the communication session comprises at least one of restricting access to the second communication channel to participants of the communication session, creating access restrictions to the second communication channel that are based on information associated with the communication session, and using the second communication channel to negotiate encryption keys for the communication session.

3. The method of claim 1, wherein the first media type is voice, wherein the second application comprises a web-based application and wherein the second media type comprises at least one of text, image, audio, and video.

4. The method of claim 3, wherein at least one communication session participant is enabled to add or modify information presented by the web-based application.

5. The method of claim 1, further comprising:
   generating session information that is unique to the communication session during the step of establishing the communication session for the first media type;
   forwarding the unique session information to participant endpoints of the communication session; and
   using the unique session information to establish the second communication channel.

6. The method of claim 5, further comprising:
   receiving a request to establish the second communication channel; and
   creating a web page with the unique session information.

7. The method of claim 6, further comprising:
   receiving a request to access the web page;
   determining whether the request comprises the unique session information; and
   determining access permissions to the web page based on the following logic:
   (a) in the event that the request comprises unique session information that matches the unique session information used to create the web page, allowing access to the web page; and
   (b) in the event that the request does not comprise unique session information that matches the unique session information used to create the web page, restricting access to the web page.

8. The method of claim 6, wherein the number of simultaneous logins allowed for the web page is limited to a number of participants engaged in the communication session.

9. The method of claim 1, wherein the communication session comprises a conference call between three or more participants.

10. A non-transitory computer readable medium comprising processor executable instructions that, when executed by a processor, are operable to perform the method of claim 1.

11. A communication system, comprising:
    a non-transitory computer-readable storage medium comprising instructions stored thereon and a processor configured to execute the instructions, wherein the instructions stored on the computer-readable storage medium include:
    a first application operable to support a first media type and establish a communication session between a plurality of participants using the first media type between at least two endpoints; and
    a second application that is operable to establish a second communication channel, wherein the second communication channel supports a second media type that is different from the first media type, and wherein the second application is operable to associate the second communication channel with the communication session while the communication session is in progress, wherein the second communication channel is associated with the communication session by creating a link to the second communication channel based on information associated with the communication session, the link being dynamically created and incorporating information unique to the communication session, the link being to one or more dynamically-created write-enabled web pages for editing or viewing by the participants.

12. The system of claim 11, wherein the second application is operable to associate the second communication channel with the communication session by at least one of restricting access to the second communication channel to participants of the communication session, creating access restrictions to the second communication channel that are based on information associated with the communication session, and using the second communication channel to negotiate encryption keys for the communication session.

13. The system of claim 11, wherein the first media type is voice, wherein the second application comprises a web-based application and wherein the second media type comprises at least one of text, image, audio, and video.

14. The system of claim 13, wherein at least one communication session participant is enabled to add or modify information presented by the web-based application.

15. The system of claim 11, wherein the first application is further operable to generate session information that is unique to the communication session and forward the unique session information to participant endpoints of the communication session and wherein the second application is further operable to use the unique session information to establish the second communication channel.

16. The system of claim 15, wherein the second application is further operable to receive a request to establish the second communication channel, and create a web page with the unique session information.

17. The system of claim 16, wherein the second application is further operable to receive a request to access the web page, determine whether the request comprises the unique session information, and determine access permissions to the web page based on the following logic:

(a) in the event that the request comprises unique session information that matches the unique session information used to create the web page, allow access to the web page; and (b) in the event that the request does not comprise unique session information that matches the unique session information used to create the web page, restrict access to the web page.

18. The system of claim 16, wherein the number of simultaneous logins allowed for the web page is limited to a number of participants engaged in the communication session.

19. The system of claim 16, wherein request comprises at least one of (i) an http GET request, (ii) an https GET request, and (iii) a predetermined sequence of DTMF tones.

20. The system of claim 11, wherein the communication session comprises a conference call between three or more participants.

* * * * *